United States Patent
Peterson et al.

(10) Patent No.: US 11,123,876 B2
(45) Date of Patent: Sep. 21, 2021

(54) METHOD FOR SENSOR DATA PROCESSING (71) Applicant: Caterpillar Inc., Deerfield, IL (US)

(72) Inventors: Kevin Peterson, San Francisco, CA (US); Matt Delaney, San Francisco, CA (US); Zachary Witte, San Francisco, CA (US); Jason Calaiaro, San Francisco, CA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/902,023

(22) Filed: Jun. 15, 2020

(65) Prior Publication Data

US 2020/0306985 A1 Oct. 1, 2020

Related U.S. Application Data (63) Continuation of application No. 15/951,891, filed on Apr. 12, 2018, now Pat. No. 10,717,198.

(60) Provisional application No. 62/484,531, filed on Apr. 12, 2017.

(51) Int. Cl.
| | |
|---|---|
| B25J 13/00 | (2006.01) |
| G05D 1/00 | (2006.01) |
| B25J 19/02 | (2006.01) |
| B25J 9/16 | (2006.01) |
| H04N 19/184 | (2014.01) |
| B25J 13/08 | (2006.01) |
| H04N 19/37 | (2014.01) |
| H04N 19/39 | (2014.01) |

(52) U.S. Cl.
CPC ........... *B25J 13/006* (2013.01); *B25J 9/1697* (2013.01); *B25J 13/089* (2013.01); *B25J 19/023* (2013.01); *G05D 1/0022* (2013.01); *G05D 1/0038* (2013.01); *H04N 19/184* (2014.11); *H04N 19/37* (2014.11); *H04N 19/39* (2014.11); *G05B 2219/40536* (2013.01); *G05D 2201/02* (2013.01)

(58) Field of Classification Search
CPC ...... B25J 13/006; B25J 9/1697; B25J 19/023; B25J 13/089; H04N 19/37; H04N 19/39; H04N 19/184; G05D 1/0038; G05D 1/0022; G05D 2201/02; G05B 2219/40536
USPC ........................................................ 700/259
See application file for complete search history.

(56) References Cited

U.S. PATENT DOCUMENTS

| | | | |
|---|---|---|---|
| 9,589,595 B2* | 3/2017 | Gao | G06K 9/32 |
| 10,194,163 B2* | 1/2019 | Richert | G06T 7/215 |
| 10,386,999 B2* | 8/2019 | Burns | H04N 21/2387 |
| 2004/0027451 A1* | 2/2004 | Baker | H04N 5/2259 |
| | | | 348/46 |
| 2015/0179219 A1* | 6/2015 | Gao | G06T 7/254 |
| | | | 386/278 |
| 2015/0341633 A1* | 11/2015 | Richert | G06T 7/215 |
| | | | 375/240.16 |
| 2016/0063727 A1* | 3/2016 | Gao | G06K 9/3241 |
| | | | 382/103 |
| 2017/0180729 A1* | 6/2017 | Wu | H04N 19/115 |

(Continued)

*Primary Examiner* — Jaime Figueroa
(74) *Attorney, Agent, or Firm* — Xsensus LLC (57) ABSTRACT

A method for remote operation of a robot, preferably including: recording a set of sensor streams; transmitting a transmission stream; selecting a received stream for display; and/or displaying the selected stream. A system, preferably including a robot and a remote operation system connected to the robot by one or more communication networks.

20 Claims, 4 Drawing Sheets

(56) References Cited

U.S. PATENT DOCUMENTS

2018/0113577 A1\* 4/2018 Burns .............. H04N 21/47217
2018/0115788 A1\* 4/2018 Burns ................ G06K 9/00771

\* cited by examiner

METHOD FOR SENSOR DATA PROCESSING

CROSS-REFERENCE TO RELATED APPLICATIONS

This application is a continuation of U.S. patent Nonprovisional patent application Ser. No. 15/951,891 filed 12 Apr. 2018 claims the benefit of U.S. Provisional Application Ser. No. 62/484,531, filed on 12 Apr. 2017, which is incorporated in its entirety by this reference.

TECHNICAL FIELD

This invention relates generally to the robotic teleoperation field, and more specifically to a new and useful method for robot sensor data processing in the robotic teleoperation field.

BACKGROUND

Robots can be equipped with many sensors to enable operation and data collection from the surroundings of the robot. These sensors typically collect vast quantities of data continuously or nearly-continuously as the robot is operating, under human control or otherwise. The robots are also typically connected to a network (e.g., the Internet) by one or more uplinks of varying types. These networks typically lack the capacity or capability to uplink the data collected by the sensors in real time or near real time, which may be useful for robot operation (e.g., teleoperation). This can result in real time data loss and degradation, inadequate and/or incomplete robot control, as well as the inability to recall lost data for future use.

Thus, there is a need in the robotic teleoperation field to create a new and useful method for processing robot sensor data. This invention provides such a new and useful method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
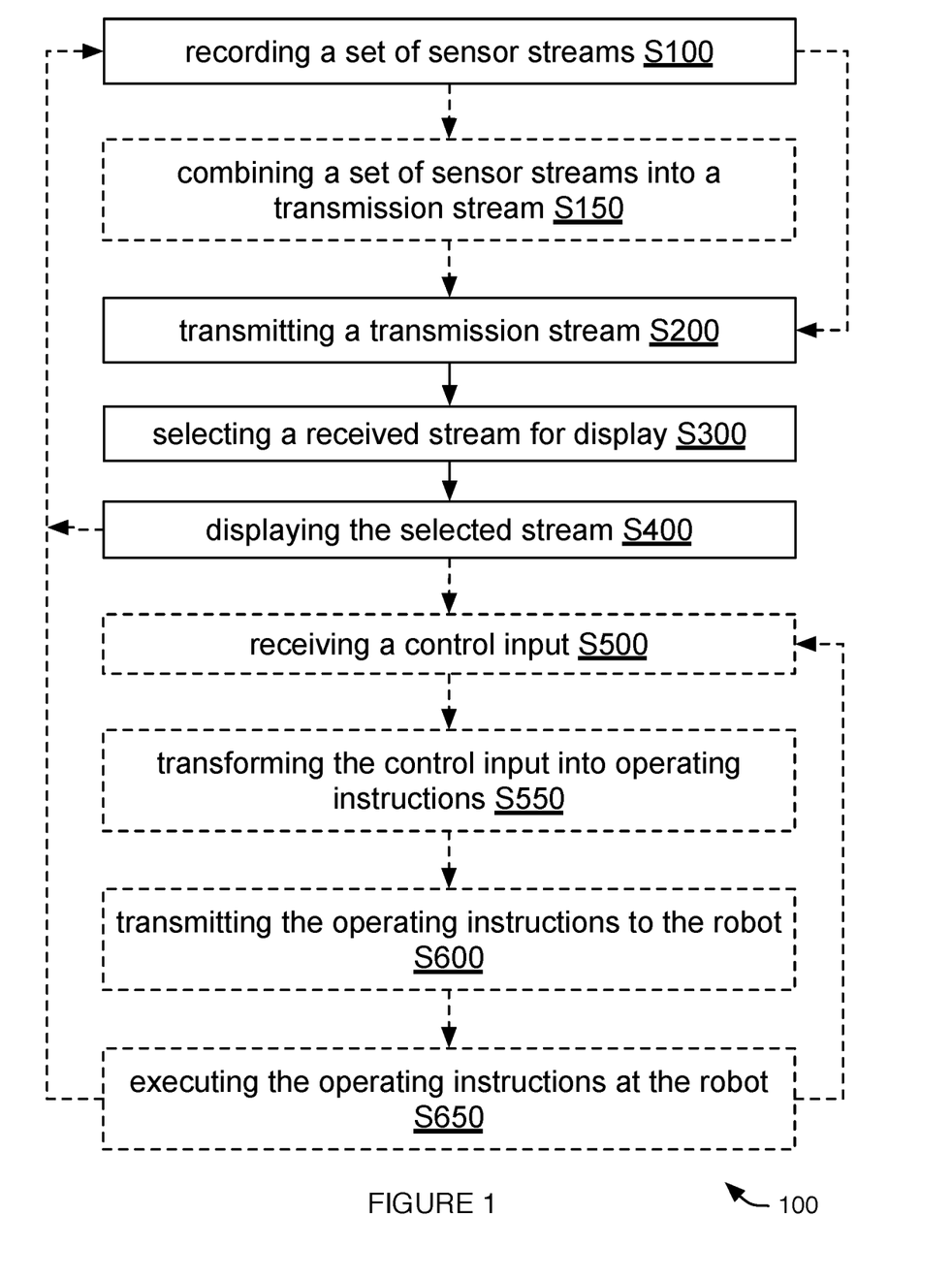
FIG. 1 is a schematic illustration of an embodiment of the method.
Figure 2:
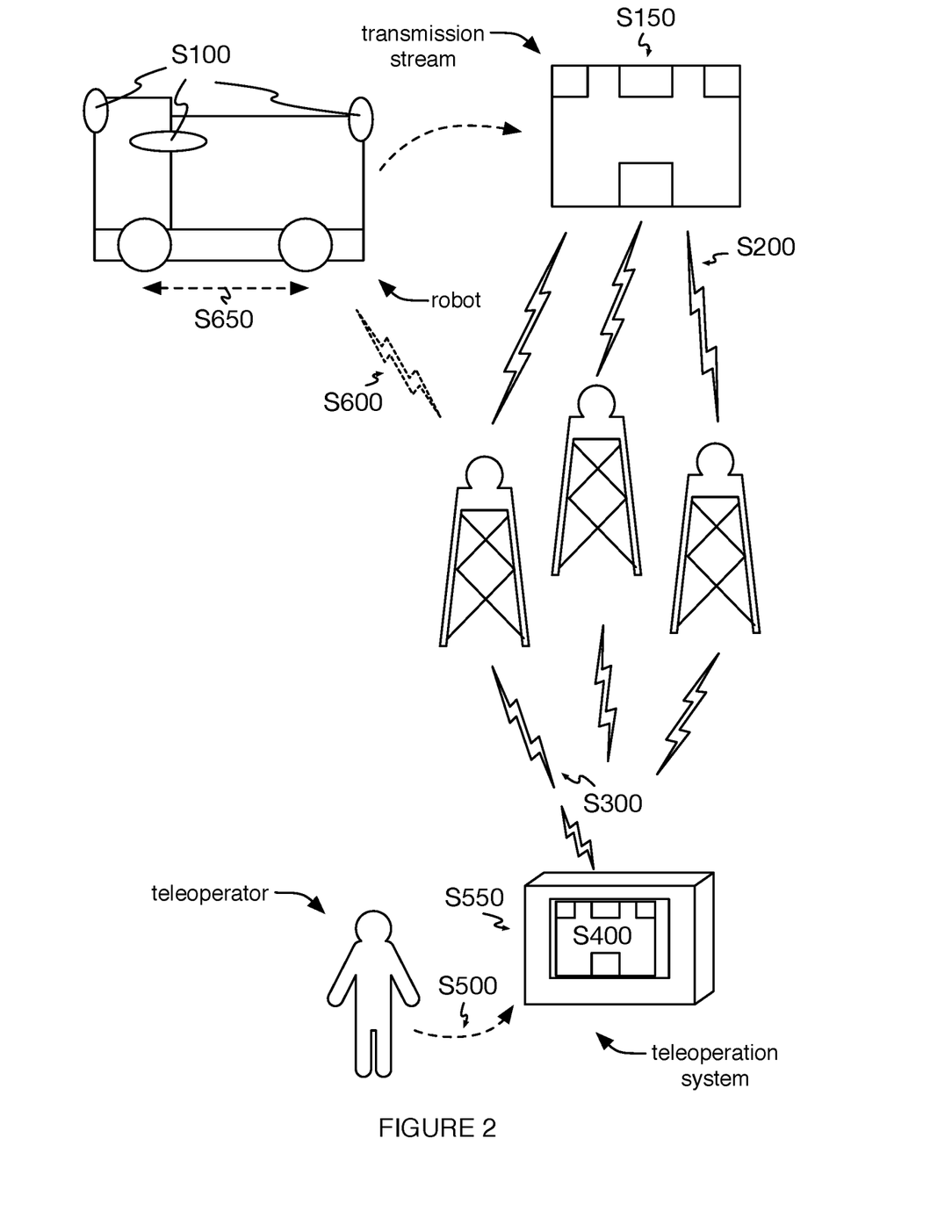
FIG. 2 is a flowchart of a specific implementation of an embodiment of the method.

A method 100 for sensor data processing preferably includes (e.g., as shown in FIG. 1): recording a set of sensor streams S100; transmitting a transmission stream S200; selecting a received stream for display S300; and/or displaying the selected stream S400. The method 100 can additionally or alternatively include (e.g., as shown in FIG. 2): determining a robot location S140; combining the recorded set of sensor streams S150; receiving a control input S500; transforming the control input into operating instructions S550; transmitting operating instructions to the remote robot S6oo; executing operating instructions at the robot S650; and/or any other suitable elements. The method 100 functions to enable remote operation of a robot. The method 100 can additionally function to enable remote operation of a robot in real-time or near-real-time. The method 100 can additionally function to optimize power consumption of a remotely operated robot.

2. Benefits

Variants of the method 100 can confer several benefits. First, variants of the method provide data-efficient teleoperation capability to a remote robot by performing intelligent sensor stream fusion at the robot prior to transmission. This can result in lower bandwidth and/or latency requirements for data transmission.

Second, variants of the method can improve reliability and performance of robot teleoperation by transmitting and/or receiving duplicate data over multiple network channels substantially concurrently, and selecting data received over the network channel of highest quality for use in teleoperation.

Third, variants of the method can enable real- or near-real-time teleoperation of multiple remote robots by providing operation information for each robot to a single teleoperator, so that the teleoperator can allocate operating resources to the robot or robots in a suitable state for teleoperation (e.g., an idle state, a state of having recently delivered goods, a state of having recently received goods for delivery, etc.).

Fourth, variants of the method improve the technical field of remote robot operation by intelligently combining recorded data streams at the robot prior to transmission, such as by dynamically fusing multiple simultaneously recorded video streams into a single video stream at a processor of the robot. However, data streams of any suitable type can be otherwise suitably combined.

Fifth, variants of the method improve the technical field of remote robot operation by intelligently routing data between the robot and a remote operator, such as by dynamically switching data carrier infrastructure based on observed and/or estimated network performance of the network corresponding to a data carrier. However, data can be otherwise intelligently routed between a remote operator and the robot in any suitable manner, and/or the method can additionally or alternatively confer any other suitable benefit(s).

3. System

All or some of the processes described herein are preferably performed by a remote robot in cooperation with a communications network and a teleoperation system, but can alternatively be performed by a subset thereof, such as performed entirely by the remote robot, the communications network, or the teleoperation system; and/or performed by any other suitable system.

In one variation, the remote robot is a delivery robot. The remote robot is preferably a wheeled robot, but can alternatively include any suitable locomotive mechanism. The remote robot is preferably configured for sidewalk operation (e.g., the robot preferably occupies less than half the lateral width of a sidewalk while traveling along the sidewalk), but can be otherwise configured. The robot preferably includes one or more sensors (e.g., cameras, microphones, time-of-flight laser rangefinders, LiDAR sensors and/or transducers, radar sensors and/or transducers, sonar sensors and/or transducers, etc.), a control module (e.g., one or more processors, microcontrollers, embedded computers, etc.), and a communication module (e.g., with one or more cellular radios, antennae, two-way radios) operable to communicate in any suitable signal transmission format (e.g., GSM, FDMA, TDMA, CDMA, Wi-Fi, 3G, 4G, 5G, LTE, BLE, etc.); however, the robot can additionally or alternatively include any suitable components. In variations, the communication module of the robot can include a wireless communication module that supports multiple carriers for a given communication protocol and/or class of wireless communication (e.g., Verizon™ and AT&T™), using any suitable radio (e.g., the same radio, different radios, multiple instances of the same radio configuration, etc.). The remote robot is preferably operable autonomously (e.g., based on on-board sensor measurements), but can additionally or alternatively be operable semi-autonomously, via remote-control, manually, or in any other suitable manner.

The communications network is preferably a cellular communication network (e.g., including infrastructure corresponding to multiple carriers and/or service providers), but can additionally or alternatively include local area networks (e.g., Wi-Fi networks), radio networks (e.g., FM broadcast networks, AM broadcast networks, 2-way radio communication channels, etc.), and any other suitable communication networks.

The teleoperation system preferably includes a display (e.g., a screen) and any other suitable output mechanisms (e.g., speakers, indicator lights, etc.), at least one input (e.g., a joystick, a touchscreen integrated into the display, a touchscreen distinct from the display, an application-based control interface rendered at a touchscreen or otherwise, a switch, a button, etc.), and a communication module (e.g., including an Ethernet-based internet connection, wireless transmission mechanisms of any suitable type); however, the teleoperation system can additionally or alternatively include any suitable components. The communication module of the teleoperation system preferably supports, implements, or otherwise includes the same communication mechanisms and/or protocols as the remote robot, but can alternatively support different communication mechanisms and/or protocols.

4. Method

Figure 3:
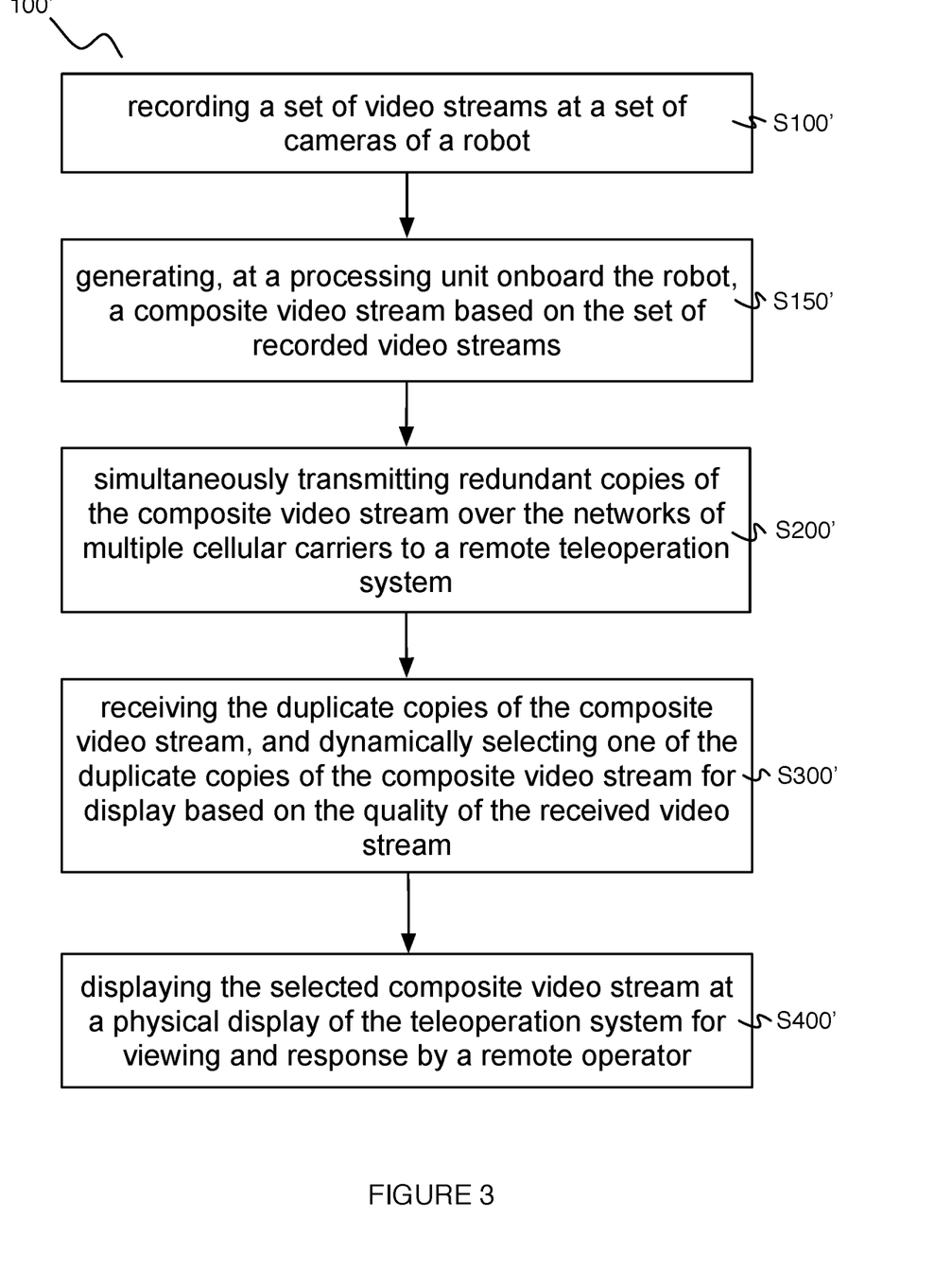
FIG. 3 is a schematic illustration of a specific implementation of an embodiment of the method.

In a first example implementation of the method (e.g., as shown in FIG. 3), the method 100' includes recording a set of video streams at a set of cameras of a remote robot S100'. The set of video streams includes a video stream of the area in front of the robot (e.g., a front video stream), a video stream of the areas to the left and right of the robot (e.g., left and right video streams, respectively), a video stream of the area immediately in front (e.g., between zero and twelve inches in front of) of the robot (e.g., a near-front video stream), and a video stream of the area behind the robot (e.g., a rear video stream). Each video stream is recorded by a corresponding video camera, which can have any suitable resolution, viewing angle, or other suitable camera and/or imaging properties. The example implementation includes generating, at a processing unit onboard the robot, a composite video stream based on the set of recorded video streams S150'. Block S150' includes remapping the frames of each of the set of recorded video streams onto a single frame of the composite video stream, which can include downsampling, upsampling, resizing, pixel selection (e.g., cropping), resolution alteration (e.g., downscaling, upscaling), sampling rate alteration, compression (e.g., lossy compression), and/or otherwise suitably adjusting frames of each of the set of recorded video streams in order to generate the composite video stream. This example implementation further includes transmitting duplicate copies of the composite video stream over the networks of multiple cellular carriers (e.g., AT&T, Verizon, Sprint, etc.) substantially concurrently (e.g., simultaneously) to a remote teleoperation system S200'. Block S200' includes transmitting duplicate copies of the composite video stream over each carrier's network, but alternative examples can include transmitting transformed copies of the composite video stream over each carrier's network (e.g., each copy can be tailored to a specific carrier's network standards, specifications, etc.). This example further includes receiving the duplicate copies of the composite video stream, and dynamically selecting one of the duplicate copies of the composite video stream for display based on the received video stream's quality (e.g., determined based on the number of dropped frames, lag, frame rate, etc.) S300'. Related examples can additionally or alternatively include selecting the copy of the composite video stream based on the respective carrier's network quality of service (e.g., determined for each carrier's network by the teleoperation system, the vehicle, etc.). This example further includes displaying the selected composite video stream at a physical display of the teleoperation system for viewing and response by a remote operator S400', and can optionally include receiving operation instructions from the remote operator and transmitting the operation instructions to the robot (e.g., through the same or different communication channel from which the displayed video stream was received).

Block S100 recites: recording a set of sensor streams, which functions to obtain data indicative of the surroundings of the remote robot. Block S100 can additionally function to provide data to a remote operator and/or for onboard processing. Recording a set of sensor streams is preferably performed by sensors of the robot, preferably in cooperation with a control module of the robot (e.g., a processor). The sensor streams are preferably recorded in response to being sampled (e.g., recorded substantially immediately after sampling and/or within a threshold time after sampling, such as 100 ms, 250 ms, 500 ms, 1 s, 2 s, 3 s, 5 s, 30 s, 0.1-1 s, 10-100 s, etc.), but can additionally or alternatively be recorded with any other suitable timing.

In a specific example, the set of sensors from which the set of sensor streams is recorded includes five cameras: a far-forward camera, a right side camera, a left side camera, a near-forward camera, and a rear camera. However, the set of sensor streams can additionally or alternatively be recorded by any suitable sensors, such as audio sensors (e.g., microphones), motion sensors (e.g., accelerometers, gyroscopes), temperature sensors (e.g., thermocouples, thermistors, thermometers). Additionally or alternatively, recording the set of sensor streams can be otherwise suitably performed at any suitable sensors. Recording the set of sensor streams is preferably performed substantially simultaneously with transmitting (e.g., streaming sensor data to the network, such as after no more than a minimal delay for sensor data processing and/or alteration), but can additionally or alternatively be performed asynchronously (e.g., when transmitting buffered sensor data), alternating between recording and transmitting (or between combining, recording, and transmitting), or in any other suitable order. Recording the set of sensor streams preferably provides the recorded set of sensor streams to be optionally combined and transmitted, but can alternatively transfer recorded sensor streams to other blocks of the method 100 in any suitable manner. Block S100 preferably includes recording data (e.g., streams) at sensors in the form of signals (e.g., analog, digital, univariate, multidimensional) and provides the recorded signals to a processor and/or communications module of the remote robot as a data stream (e.g., a sensor stream) for each sensor; however, Block S100 can include recording in any suitable manner. Sensor streams can be transferred and/or transmitted as serial data, parallel data, or any other suitable data format.

The method 100 can optionally include Block S140, which recites determining a robot location. Block S140 can function to aid in robot operation and/or navigation, inform data transmission decisions (e.g., as described below in further detail, such as regarding Block S200), and/or serve any other suitable purpose. The robot location is preferably determined by the robot, but can additionally or alternatively be determined by the teleoperation system, one or more communication networks (e.g., cellular communication networks) and/or any other suitable elements. The robot location can be determined based on: the sensor stream(s) (e.g., using image and/or video analysis techniques to analyze video streams, etc.), data sampled by robot sensors (e.g., GPS receivers; radios such as cellular radios, Wi-Fi radios, Bluetooth radios, etc.; rangefinders; LiDAR sensors; audio sensors; etc.) and/or other sensors (e.g., external sensors, such as security cameras, traffic cameras, fixed rangefinders and/or LiDAR sensors, etc.), previously-measured data (e.g., sidewalk topography maps, such as 3D point clouds), and/or any other suitable information. The determined robot location is preferably recorded (e.g., in association with sensor streams sampled substantially concurrently with location determination) and/or transmitted (e.g., to the teleoperation system, such as along with the sensor stream), but can additionally or alternatively be handled in any other suitable manner.

The method 100 can optionally include determining and/or analyzing sidewalk joint features (e.g., control or contraction joints, expansion joints, etc.). The method can include detecting sidewalk joints (e.g., at robot sensors, such as cameras, LiDAR sensors, accelerometers, audio sensors, etc.), and optionally determining parameters associated with the joints (e.g., joint spacing; joint positions, such as relative to a curb, sidewalk inner and/or outer edge, sidewalk terminus at a roadway intersection, etc.; joint type and/or size; etc.). For example, robot speed (e.g., determined based on wheel rotation speed, GPS data, observed external object motion relative to the robot, etc.) and/or travel distance can be correlated with detected joint information to determine the joint spacing (e.g., wherein sensor data indicates that the robot passes over one joint every 1.2 s while travelling at 1 m/s in a direction normal to the joints, the joints can be determined to have a spacing of 1.2 m). The method can additionally or alternatively include determining parameters associated with the joints based on predetermined information (e.g., standard sidewalk joint parameters for a municipality or region; previously-mapped sidewalk joint parameters, selected based on the current robot location; etc.). Such parameters can be used, for example, to inform other analyses of robot surroundings (e.g., determining robot location, such as by comparing the information to previously-determined map data; determining object distances, such as in camera data; etc.). However, sidewalk joint features can additionally or alternatively be used in any other suitable manner, or not be used.

The method 100 can optionally include Block S150, which recites combining a set of streams, which functions to combine some or all of a set of streams (e.g., sensor streams, transmitted streams, received streams) into a reduced number of streams for provision to subsequent blocks of the method 100. Block S150 can additionally function to combine the recorded sensor streams into a single stream optimized for teleoperation (e.g., combining sensor streams based on relevance to immediate robot teleoperation priorities such as obstacle avoidance, locomotion, etc.). Block S150 can optionally include adding auxiliary information to the teleoperation stream(s), such as by superimposing indications of the information (e.g., numerical indications, text indications, graphical indications, etc.) onto one or more video streams of the teleoperation stream.

This can optionally include providing an indication of an obstacle or possible obstacle (e.g., pedestrian, building or wall, topographic feature, etc.). In a first specific example, this includes highlighting and/or otherwise annotating a video stream or portion of the video stream containing the obstacle to distinctly point out the obstacle to a teleoperator (e.g., superimposing one or more indications of the obstacle onto the video stream; such indications can include, for example, a box or outline surrounding the depiction of the obstacle, an arrow pointing toward the depiction of the obstacle, highlighting the region of and/or near the depiction of the obstacle, etc.). In a second specific example, this includes providing an indication of an obstacle not depicted (or not clearly depicted) by the video stream (e.g., visual indication, such as an arrow pointing in the direction of the obstacle; haptic indication, such as vibration at a teleoperator controller; etc.), such as a wall near the robot side (e.g., wherein the robot is approaching the wall, edging toward the wall during forward travel, predicted to collide with the wall, etc.) and/or a pedestrian approaching the robot (e.g., from behind). In this example, presence of the obstacle can be determined based on the video stream(s) (e.g., using image and/or video analysis techniques, such as computer vision techniques including, for example, image segmentation, edge finding, object classification, etc.), data sampled by robot sensors (e.g., rangefinders, LiDAR sensors, audio sensors, etc.) and/or other sensors (e.g., external sensors, such as security cameras, traffic cameras, fixed rangefinders and/or LiDAR sensors, etc.), the robot location (e.g., determined as described above regarding Block S140), previously-measured data (e.g., sidewalk topography maps, such as 3D point clouds), and/or any other suitable information.

This can additionally or alternatively include providing an indication of a suggested robot route and/or the information associated with one or more points of interest (e.g., intended destination, next turn, selected parking location, etc.). In specific example, such indications can include: arrows (e.g., indicating a current suggested direction, a direction of the next suggested turn, etc.), text (e.g., indicating directions and/or distances, such as "Turn right in 50 ft"), annotations such as highlighting and/or outlining (e.g., indicating the location of a point of interest), and/or any other suitable indications.

This can additionally or alternatively include providing an indication of possible robot maneuvers. For example, an indication of possible or maximal robot turning maneuvers (e.g., line indicating left and/or right turns of minimum radius, highlighting all regions accessible to the robot without driving backward, etc.) can be superimposed on the video stream.

Figure 4:
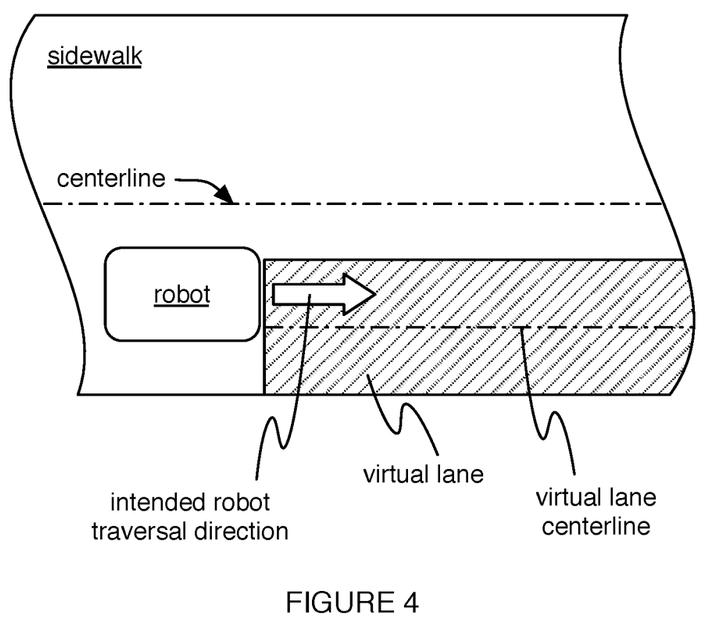
FIG. 4 is a plan view depicting a virtual lane for robot traversal.

This can additionally or alternatively include providing an indication of a virtual lane defined on a robot traversal surface (e.g., sidewalk, pedestrian path, and/or other walkway), such as shown in FIG. 4. This can function to aid teleoperators in guiding the robot along the virtual lane (e.g., rather than substantially down the middle of the walkway). The virtual lane can be determined based on a preferred walkway traversal side (e.g., right side, left side), such as a right- or left-most width segment (e.g., half, third, quarter, etc.) of the walkway. The indication can include highlighting and/or borders of the virtual lane, a target centerline (e.g., center of the virtual lane width) for the robot to traverse along, and/or any other suitable indications. In a specific example, when an obstacle (e.g., stationary obstacle, pedestrian walking toward the robot, etc.) is present in the virtual lane, the virtual lane can be deformed to avoid the obstacle (e.g., curved around the obstacle). However, this can additionally or alternatively include providing any other suitable indications in any suitable manner.

Block S150 can additionally function to combine the recorded sensor streams into a single stream optimized for transmission over a network (e.g., according to bandwidth limitations of the network, framerate limitations of the network, etc.). Block S150 can additionally function to combine a set of transmitted streams (e.g., sensor streams having been transmitted without previously being combined) into a reduced number of streams at the teleoperation system. However, in variations, Block S150 can include combining any suitable set of streams for any suitable purpose.

Block S150 is preferably implemented at a processor of the remote robot, but can additionally or alternatively be performed at a processor of the teleoperation system, distributed between processors of the remote robot and the teleoperation system, or at any suitable computing system at any suitable location or locations. Block S150 is preferably performed prior to transmitting, and after recording, but can alternatively or additionally be performed after receiving one or more streams from the network (e.g., disparate sensor streams can be combined at the teleoperation system upon reception, before displaying the selected stream, etc.), or with any suitable timing relative to other blocks of the method 100. Variations of Block S150 can include combining duplicate streams received at the teleoperation system over different carriers' networks into a single stream of higher stream quality than any individual duplicate stream received over a corresponding carrier's network (e.g., by eliminating redundant packets between duplicate received streams and replacing dropped packets in one stream with packets from another duplicate received stream in which the packets were not dropped).

Combining the set of streams can be based on a determined (e.g., predetermined, dynamically determined) selection of streams (e.g., recorded streams, streams received via transmission, etc.). Accordingly, Block S150 can include: determining a set of streams for combination (Block S155) and generating a combined stream from the determined set of streams (Block S160).

The determined set of streams is preferably a set of sensor streams, but can additionally or alternatively be any suitable set of streams (e.g., transmission streams, received streams, combined streams, etc.). The combined frames are preferably recorded within a threshold time of each other (e.g., recorded simultaneously, recorded within 1s), but can alternatively be otherwise related to each other. Block S155 can be based on operating instructions (e.g., a request for specific streams received from a teleoperator; a selection of streams specified by a teleoperator; streams selected based on teleoperator operating instructions, such as leftward-oriented streams in response to a left turn instruction and/or backward-oriented streams in response to a backing instruction; etc.), internal instructions (e.g., resulting from a trigger, a predetermined template, computed instructions from a control module, etc.), sensor measurements (sampled by robot sensors, external sensors, etc.), localization information (e.g., robot location, such as determined in Block S140), and/or any other suitable basis.

In a first variation, determining the set of streams for combination includes automatically combining a subset of recorded sensor streams according to a predetermined format (e.g., a composite frame format including the front, right, left, near-front, and rear frames combined into a single video frame).

In second variation, determining the set of streams for combination includes adjusting which sensor streams are combined, such as according to received operating instructions (e.g., the front view camera and near-front view camera streams are combined in response to receiving operating instructions commanding the robot to move forward from a stopped state) and/or information determined based on sensor measurements (e.g., sampled by sensors of the robot). For example, Block S155 can include: sampling one or more measurements (e.g., at one or more sensors of the robot and/or external sensors, such as cameras, proximity sensors, LiDAR sensors, audio sensors, etc.); based on the measurements, determining priority states associated with one or more of the sensors and/or sensor streams; and determining the set of streams based on the priority states, such as by using the priority states to modify a predetermined format (e.g., wherein streams associated with increased priority states are included, a bitrate budget for the stream is increased, and/or a display size, prominence, and/or intensity for the stream is increased; wherein streams associated with decreased priority states are excluded, a bitrate budget for the stream is decreased, and/or a display size, prominence, and/or intensity for the stream is decreased; etc.). Accordingly, a low-priority video stream can be excluded, downsampled, downscaled, cropped, highly compressed, relocated to an auxiliary display position (e.g., along a side of a display), and/or otherwise deprioritized. Analogously, a high-priority video stream (e.g., that is typically deprioritized when not associated with an increased priority state, such as by being excluded, downsampled, downscaled, cropped, highly compressed, and/or located at an auxiliary display position) can be prioritized (e.g., by being included; by being downsampled, downscaled, cropped, and/or compressed to a lesser extent; by being relocated to a prominent position, such as near a display center; etc.).

In a first example, a priority state changes as the robot traverses past a visual obstacle. For example, as the robot drives next to a wall (e.g., opaque wall), a video stream depicting the wall (e.g., from a side-facing camera) may not be of much use to a teleoperator (e.g., set to a low priority state), and so can be deprioritized (e.g., excluded, bitrate reduced, etc.). Once the video stream depicts more than just the wall (e.g., as the robot begins to move past the wall and/or around a blind corner), the video stream can be prioritized (e.g., reset to a typical priority state; set to a high priority state, such as to compensate for the earlier lack of sensor information in the direction of the video stream; etc.).

In a second example, a priority state changes in response to obstacle detection and/or encounter. For example, in response to determining the presence of an obstacle (e.g., sidewalk topography unsuitable for robot traversal) in a video stream, the priority state of the video stream can be increased.

In a third example, a priority state changes in relation to a pedestrian crosswalk (e.g., in response to robot proximity to the crosswalk, robot motion toward and/or into the crosswalk, robot navigation guidance indications that the robot should soon enter the crosswalk, etc.). Such priority state changes can function to, for example, provide and/or prioritize camera views of crosswalk-related features (e.g., traffic lights; crossing indicators, such as those indicating that pedestrians may walk freely, should not enter the crosswalk, should have exited the crosswalk, etc., preferably including a countdown timer and/or other numerical indication of time remaining to cross the street; ramps and/or curb cuts bridging the crosswalk and adjacent sidewalks, such as the sidewalk on which the robot is currently located and/or the sidewalk to which the robot will go upon crossing the street at the crosswalk; obstacles in and/or near the crosswalk, such as vehicles; the crosswalk itself; etc.) that may be relevant to a teleoperator while controlling the robot to cross the street at the crosswalk. For example, views of one or more such features can be included in the transmitted sensor stream (e.g., in addition to one and/or in place of or more primary views, superimposed on one or more primary views, etc.), and/or can be analyzed (e.g., at the robot, at the teleoperation system, etc.) to determine information associated with the features (e.g., crossing indicator state, such as countdown timer value; traffic light color and/or other state; presence, absence, and/or nature of obstacles in the crosswalk and/or curb cuts; etc.), wherein one or more such features and/or information determined based on such features (e.g., recommendation to cross or not cross, such as based on the remaining time, current robot location, obstacle presence, etc.; minimum speed to cross the street before the crossing cycle ends; etc.) can be presented to the teleoperator (e.g., superimposed on a video stream, included in a transmitted sensor stream, etc.).

In a specific example, the robot's primary forward view camera (e.g., the camera that captures a primary video stream, such as a high-priority stream that is typically transmitted at a high bitrate and displayed in a large central position at the teleoperation system) is a wide-angle camera, and the robot also includes a second, narrower-angle camera (e.g., standard-angle, long focal length, telephoto, etc.) with a partially- or fully-overlapping view region as the primary forward view camera. The second camera is associated with a lower-priority video stream (e.g., stream that is typically deemphasized, reduced to a low bitrate, and/or excluded from transmission), such as one that is not typically displayed to the teleoperator. However, in or near a crosswalk, the primary video stream may not adequately depict one or more relevant crosswalk-related features (e.g., crossing indicator). Thus, based on the robot relationship to the crosswalk (e.g., in response to sampling a measurement indicative of crosswalk proximity, etc.), an increased priority state for the second camera can be determined. Based on this increased priority state, all or some (e.g., a cropped portion depicting the sidewalk-related feature, such as the crossing indicator) of the second camera video stream (and/or information determined based on the crosswalk-related features depicted in the second camera video stream) can be included and/or emphasized (e.g., allotted an increased bitrate, placed prominently within the combined video stream, etc.).

Presence of and/or proximity to the crosswalk can be determined based on, for example: correlation of the robot location (e.g., determined as described above, such as a precise location determined based on sidewalk topography) to map data (e.g., indicative of crosswalk, sidewalk, and/or roadway positions); detection of crosswalk-related features (e.g., crosswalk markings such as boundary lines and/or zebra stripes; curb cuts and/or curb ramps; tactile warning devices, such as those integrated into curb ramps; traffic lights; crossing indicators; intersection of two sidewalks and/or roadways; automobile traffic, such as oriented substantially normal the sidewalk direction and/or direction of robot traversal; sidewalk termination, such as at a roadway; pedestrian crossing request devices such as buttons and/or touch sensors; pedestrian instructions, such as spoken instructions to wait or to begin crossing; etc.), such as by image and/or video analysis (e.g., using computer vision techniques) and/or analysis of other sensor data (e.g., LiDAR and/or audio data indicative of automobile positions and/or motion, IMU data indicative of traversal over a ramp or tactile warning device, audio data indicative of pedestrian crossing instructions, etc.).

In one variation, stream priority states are changed in response to (e.g., immediately in response to) determination of the reason for the change (e.g., detection of robot proximity to the crosswalk) and/or adequate preparation of a stream for teleoperator use (e.g., wherein a crossing indicator view is to be cropped from a video stream and added to the transmission stream, in response to detection of the crossing indicator position within the video stream). In a second variation, stream priority states are changed in response to determining that the information associated with the stream may be of immediate use. In one example, rather than changing immediately upon detection of a proximal crosswalk, such a priority change can be delayed until street crossing is predicted to be the next substantive task undertaken by the robot (e.g., once there are no obstacles, or no obstacles except pedestrians predicted to be planning and/or waiting to cross the street, between the robot and the crosswalk). In a second example, the priority change is delayed until a threshold amount of time (e.g., 1, 2, 3, 5, 10, 15, 30, 0-1, 1-3, 3-10, 10-30, 30-90 s, etc.) before a relevant event (e.g., robot reaches the intersection and/or enters the crosswalk, overtaking pedestrian reaches the robot, etc.) is expected to occur. However, the stream priority states can additionally or alternatively be changed with any other suitable timing (wherein the associated stream processing and/or selection for transmission and/or display is preferably changed immediately in response to the priority state change, such as described above).

However, the set of streams for combination can additionally or alternatively be determined in any other suitable manner.

Block S160 can include determining a data rate (e.g., sampling rate, framerate, bitrate, etc.) of the combined sensor stream and/or any of the constituent (or possible constituent) sensor streams (e.g., sensor stream as sampled and/or recorded; processed sensor stream, such as a sensor stream for which the bitrate has been reduced in preparation for transmission; etc.), such as before generating the combined sensor stream, based on a network connection characteristic (e.g., network carrying capacity), an end-use of the sensor stream (e.g., computer-vision-based object detection and tracking requiring a first framerate, manual locomotive control requiring a second framerate, etc.), available processing power of the robot processor, sensor stream priority states, and/or any other suitable basis. In examples, the bitrates (e.g., bitrate of the stream as-transmitted, such as that stream's contribution to the overall transmission stream bitrate; bitrate of the processed stream, such as before combination into the transmission stream and/or compression of the combined transmission stream; bitrate of the sampled and/or recorded stream; etc.) of different sensor streams (e.g., video streams from different cameras) and/or the same sensor stream at different times (e.g., before and after a priority state change, network capacity change, etc.) can differ by more and/or less than a bitrate ratio (e.g., 0.05, 0.1, 0.25, 0.5, 0.75, 0.85, 0.9, 0.95, 1, 1.1, 1.25, 1.5, 2, 3, 5, 10, 25, 0.01-0.1, 0.1-0.9, 0.9-1.1, 1.1-10, 10-100, etc.). However, the sensor stream bitrates can additionally or alternatively differ by any other suitable amount, and/or can be identical.

Block S160 can additionally or alternatively include interleaving data from each of the determined set of streams into a combined stream, wherein the combined stream includes the data of each of the determined set of streams; in further alternatives, some data can be eliminated (e.g., generation of the combined sensor stream is lossy) according to a compression algorithm during interleaving. In a first example, Block S160 includes pixel-by-pixel remapping of video frames of differing video resolutions into a single frame area, having a single video resolution, by downscaling high-resolution frames and/or upscaling low resolution frames and combining the downscaled and/or upscaled frames into a single composite frame. In a second example, Block S160 includes image and/or video stitching, such as via processes including cropping, translation, rotation, scaling, Affine transformation, adjustments of visual features such as color, brightness, and/or contrast, and/or any other suitable processes (e.g., to generate a mosaic arranged based on a map projection, such as rectilinear, cylindrical, spherical, Panini, fisheye, stereographic, etc.). Block S160 can additionally or alternatively include combining audio and video sensor streams into a single audio/video (AV) stream by combining AV data according to a standard AV interface protocol (e.g., HDMI). However, Block S160 can include generating a combined stream in any suitable manner.

Block S200 recites: transmitting a transmission stream (e.g., over a plurality of channels), which functions to provide data to the teleoperation system. Block S200 can additionally function to provide redundant transmission of sensor data (e.g., to enhance transmission reliability), and/or transfer transmission stream data to the teleoperation system for selection. Block S200 preferably includes transmitting transmission streams (e.g., duplicate streams; similar streams, such as differently-compressed streams from the same or similar uncompressed version; different streams, such as streams including different subsets, arrangements, and/or prioritizations of constituent sensor streams; etc.) over a plurality of channels (e.g., substantially concurrently, at different times, etc.), but can alternatively include transmitting the transmission stream over a single channel. Block S200 is preferably performed at the communication module of the robot, but can additionally or alternatively be performed at the teleoperation system (e.g., for transmitting operating instructions to the robot, wherein the transmission stream in this case includes the operating instructions). Block S200 is preferably performed contemporaneously with combining the set of streams (e.g., when streaming the combined stream), but can additionally or alternatively be performed contemporaneously with sensor stream recording (e.g., when directly streaming raw sensor streams), asynchronously, periodically, or with any other suitable timing. The transmission stream can be any stream suitable for transmission, such as a combined (e.g., composite) stream (e.g., generated in S150), a raw sensor stream (e.g., recorded in S100), a processed sensor stream, or any other suitable stream.

In a first variation, transmitting a transmission stream can include sending a generated transmission stream over a set of network channels. The set of network channels in this variation can be predetermined, dynamically determined (e.g., determined based on one or more network channels having a signal strength over a signal strength threshold), or otherwise determined. In an example, each of the network channels can correspond to different cellular data carriers (e.g., service providers). Sending and/or transmitting can be performed concurrently across the set of network channels, sequentially (e.g., sending or attempting to send over a second channel after sending over a first channel fails), dynamically (e.g., switching between carriers based on quality of service feedback, received information about network quality prior to or during transmission), randomly, or otherwise performed.

Block S200 can additionally or alternatively include determining one or more channel quality metrics (e.g., associated with one or more of the transmission channels available to the robot). Channel quality metrics can include, for example, measured and/or expected (e.g., predicted) metrics such as throughput, latency, error rate, stability, cost, and/or any other suitable metrics. In a first example, channel quality metrics are determined based on current and/or recent transmission performance over the channel (e.g., by the robot, by other systems using the channel, etc.). In a second example, channel quality metrics are predicted based on the robot state, such as the robot location (e.g., determined as described above).

Block S200 can optionally include generating the transmission stream S210. The generated transmission stream preferably includes the same combination of streams throughout transmission, but can alternatively include different combinations, which can, in variations, change dynamically (e.g., based on secondary sensor streams, the context of the transmission, etc.). In a specific example, Block S210 includes generating a single composite transmission stream, and upon detection of a notification event corresponding to an impending obstacle, generating two transmission streams which include the single composite stream and a stream associated with the impending obstacle. In this example, both streams are transmitted (e.g., one stream can be assigned a higher priority and be transmitted over the channel having the highest stability parameter and/or other channel quality metric, be transmitted over more channels to increase redundancy, etc.).

A first variation of Block S210 includes generating a set of duplicate transmission streams from an original transmission stream. For example, Block S210 can include generating, from a combined sensor stream, one duplicate transmission stream per available cellular carrier channel (e.g., two duplicate transmission streams for Verizon™ and AT&T'). A second variation of Block S210 includes generating a set of transmission streams based on available network connections, wherein transmission streams corresponding to different network connections can have the same or different stream parameter values. Stream parameters can include: the number of underlying composited sensor streams, frame size, packet size, frame rate, resolution, compression (e.g., degree or method), formats, or any other suitable stream parameter.

The transmission stream preferably includes one or more timestamps. The timestamps are preferably determined based on a robot clock, but can additionally or alternatively be determined based on any other suitable clock(s). The transmission stream preferably includes transmission timestamps (e.g., associated with the time of transmission), can additionally or alternatively include sampling timestamps (e.g., associated with the time of sensor stream sampling and/or recording), processing timestamps (e.g., associated with the time of sensor stream processing and/or combination into the transmission stream), and/or any other suitable timestamps. For example, the transmission stream can include a timestamp in each packet or set of packets (e.g., indicating the time of packet transmission from the robot). Such timestamps can enable, for example, determination of transmission latency (e.g., based on round-trip transmission time), culling of stale transmissions, and/or any other suitable timing- or ordering-related processes. Additionally or alternatively, the transmission stream can include other transmission identifiers (e.g., wherein the transmission identifier is stored by the robot in association with the timestamp), and/or any other suitable information.

Block S300 recites: selecting a stream for display from the received streams, which functions to decide, among redundant received streams, which stream to display at the teleoperation system (e.g., to the teleoperator). Block S300 can include receiving one or more streams, determining stream quality, and selecting a stream based on stream quality. Block S300 is preferably performed automatically by the teleoperation system (e.g., by an autonomous operation application executing at the teleoperation system), but can additionally or alternatively be performed manually by a teleoperator at the teleoperation system (e.g., based on input data received at an input of the teleoperation system), by the robot itself (e.g., the robot determines and tags a preferred stream), or by any other suitable system component and/or entity. Block S300 is preferably performed upon reception, but can additionally or alternatively be performed prior to reception (e.g., streams can be preselected), based on a schedule (e.g., based on known network quality of differing carriers during peak hours, off-peak hours, etc.), based on the vehicle parameters (e.g., estimated or actual; based on known network quality of different carriers proximal the vehicle location; etc.), or with any other suitable timing. Selecting a stream for display can be based on stream quality (e.g., number of dropped packets, historical quality, real-time quality, quality of service, latency, bit rate, buffer fill, lag length, play length, lag ratio, bandwidth, throughput, jitter, error rate, etc.), stream priority (e.g., in cases in which the timeliness of the data is more important than the resolution or framerate, selecting a stream can be performed based on the stream having the highest synchronization to real-time), vehicle operation parameters (e.g., vehicle location, speed, etc.), or any other suitable basis. Additionally or alternatively, Block S300 can include selecting a stream for display based on operator choice (e.g., automated, manual), the cost of receiving a transmission from a particular channel (e.g., carrier-related fees) contemporaneously with selection, or any other suitable basis.

Block S300 can additionally or alternatively include determining which portions of the stream(s) to display, such as including culling of stale transmissions. For example, Block S300 can include tracking the latest (e.g., highest time value) timestamp (e.g., robot transmission timestamp) received from the robot, and selecting which portions of the stream(s) to display based on the timestamps (e.g., only displaying information received in packets associated with timestamps greater than the previously latest timestamp received, thereby ensuring that information is not shown out of order).

Block S300 can additionally or alternatively include transmitting one or more acknowledgments to the robot in response to receiving the transmissions. For example, in response (e.g., immediately in response) to receiving a packet including a robot timestamp, the teleoperation system can transmit an acknowledgment (e.g., including the received robot timestamp and/or another packet identifier, including a teleoperation system timestamp, etc.) to the robot (e.g., transmitting an acknowledgment for: every received packet; a subset of received packets, such as every tenth packet; a subset of transmitted packets, such as, for packets that include an incrementing packet identifier, every packet with an identifier ending in zero; a random subset of packets; etc.). This can enable, for example, transmission quality assessment (e.g., determining latency based on the round-trip transmission time indicated by the timestamp and/or transmission identifier, determining error rate based on the number of missed acknowledgments, etc.). The acknowledgments can be transmitted over multiple channels (e.g., duplicates transmitted over a plurality of channels, such as described above regarding transmission of the transmission stream), such as the same or different channels used for transmission stream transmission; transmitted over a single channel; and/or transmitted in any other suitable manner.

Block S400 recites: displaying the selected stream, which functions to provide the selected stream to a teleoperator at the teleoperation system (e.g., for observation, response, etc.). Block S400 is preferably performed at a display of the teleoperation system, but can additionally or alternatively be performed at any suitable display. Displaying the selected stream is preferably performed after selecting the stream for display, but can alternatively be performed at any other suitable time. Block S400 can include, in variations, rendering the selected stream at the display (e.g., rendering video at a video display, outputting audio at a speaker, synchronizing audio and video streams and displaying them in conjunction, etc.).

The method 100 can optionally include Block S500, which recites: receiving a control input, which functions to enable an operator of the teleoperation system (e.g., a human, an intelligent application, etc.) to control the robot from the teleoperation system (e.g., to remotely control the robot). Block S500 is preferably performed at an input of the teleoperation system (e.g., a switch, keyboard, mouse, joystick, microphone, touchscreen, etc.), but can additionally or alternatively be performed at an input of the robot and/or any other suitable input. Block S500 is preferably performed in response to observing (e.g., viewing, processing) the displayed and/or selected stream (e.g., images in a displayed video stream, audio in a displayed audio stream), but can additionally or alternatively be based on operator choice (e.g., not based on a received stream or telemetry) or any suitable basis.

The method 100 can optionally include Block S550, which recites: transforming the control input into operating instructions, which functions to translate inputs received at the teleoperation system into operating instructions for operating the robot. Block S550 is preferably performed at a processor of the teleoperation system, but can additionally or alternatively be performed at the robot itself, at a remote computing system, or any other suitable system. Block S550 is preferably performed after receiving a control input (e.g., Block S500) and before transmitting operating instructions to the robot, but can alternatively be performed after reception of the control input at the robot (e.g., in variations in which Block S550 is performed at the robot). In a first variation, Block S550 includes transforming a control input into operating instructions according to a predetermined set of rules (e.g., implementing a rule). For example, Block S550 can include receiving an input at the teleoperation system based on a forward push of a joystick, and transforming the input into operating instructions for the robot to move forward at a speed proportional to a displacement of the joystick from a neutral position. However, Block S550 can include transforming any suitable control input into any suitable operating instructions.

The method 100 can optionally include Block Shoo, which recites: transmitting the operating instructions to the robot, which functions to provide the operating instructions to the robot for execution. In some variations, Block Shoo can include transmitting control inputs directly to the robot, at which the control inputs can be transformed into operating instructions (e.g., in a variation of Block S550). Block Shoo is preferably performed by a communication module of the teleoperation system, and preferably includes transmitting operating instructions over a network; however, Block Shoo can additionally or alternatively be performed by any suitable system, and can additionally or alternatively include transmitting operating instructions in any suitable manner (e.g., over a two-way transceiver link). The network is preferably associated with a previously-selected channel and/or carrier (e.g., based on channel or carrier signal quality, be the channel from which the displayed stream was received, be a different channel, etc.), but in variations Block Shoo can additionally or alternatively include transmitting duplicate operating instruction streams to the robot over multiple channels and/or carriers (e.g., in a similar manner to Block S200 as described above) and selecting an operating instruction stream at the robot (e.g., in a similar manner to Block S300 as described above). The transmitted operating instructions preferably include a robot timestamp and/or other transmission identifier (e.g., as described above regarding Block S300), such as wherein the operating instructions are transmitted in place of or in addition to an acknowledgment. The identifier can be associated with the latest timestamp received from the robot, can be the identifier associated with the stream most recently displayed to the teleoperator, and/or can be any other suitable transmission identifier. However, Block Shoo can include transmitting in any other suitable manner.

The method 100 can optionally include Block S650, which recites: executing the operating instructions, which functions to modify and/or maintain robot operation according to signals received from the teleoperation system. Block S650 is preferably performed at the robot, but can alternatively be performed by any suitable entity (e.g., a human associated with the robot). Block S650 is preferably performed after the control input is transformed into operating instructions, and preferably after receiving the transmitted operating instructions, but can alternatively be performed directly after transforming the control input into operating instructions (e.g., when raw control inputs are transmitted to and transformed into operating instructions at the robot). Block S650 can, in variations, be implemented by actuating actuators (e.g., wheels, motorized doors, motorized camera mounts, etc.), controlling outputs (e.g., blinking LEDs, sounding sirens, playing attention-getting sounds such as series of beeps, speaking compliments directed toward, for example, nearby pedestrians, etc.), and any other suitable means of executing operating instructions. In a first variation, Block S650 can include executing operating instructions according to a set of predetermined rules (e.g., machine executable code). In a second variation, Block S650 can include dynamically adjusting the execution of operating instructions based on contextual parameters (e.g., extracted from recorded sensor streams).

Block S650 can optionally include accounting for operating instruction latency (e.g., determined based on a robot timestamp and/or other transmission identifier sent to the robot along with the operating instructions, such as described above). In a first example, the robot tracks the latest timestamp or other identifier received in association with operating instructions and/or an acknowledgment, and discards and/or requests confirmation (e.g., from the teleoperation system) for stale instructions (e.g., instructions associated with timestamps or identifiers earlier than the tracked value; instructions wherein the associated timestamp is older than the tracked value by more than a threshold time interval, such as 0.05 s, 0.1 s, 0.2 s, 0.5 s, 1 s, 2 s, 0.01-0.1 s, 0.1-2 s, etc.). For example, stale continuous drive instructions (e.g., determined based on a teleoperation system joystick position) can be discarded, whereas stale discrete commands (e.g., emit noise, enter different operation state, etc.) can prompt the robot to request confirmation (e.g., wherein the teleoperation system displays a request for confirmation, and the teleoperator can indicate that the robot should perform or ignore the instructions), or can be performed regardless of their stale condition (or performed only if they are stale by less than a threshold time interval, such as 1 s, 2 s, 5 s, 10 s, 15 s, 1-10 s, 10-60 s, etc.). In a second example, the robot enters a more conservative operation mode in response to determining a high amount of latency (and/or based on other factors indicative of poor transmission quality, such as transmission error rate, degradation of video quality received by the teleoperation system, etc.). For example, for latency less than a first threshold value (e.g., 0.1 s, 0.15 s, 0.2 s, 0.25 s, 0.3 s, 0.35 s, 0.4 s, 0.5 s, 0.05-0.2 s, 0.2-0.3 s, 0.3-1 s, etc.), the robot can operate in a normal condition; for latency between the first threshold value and a second threshold value (e.g., 0.3 s, 0.4 s, 0.5 s, 0.6 s, 0.7 s, 0.8 s, 0.9 s, 1 s, 1.25 s, 1.5 s, 0.2-0.6 s, 0.6-0.8 s, 0.8-2 s, etc.), the robot can operate in a conservative mode (e.g., wherein the robot's speed is reduced compared with the normal condition, such as reduced according to a linear function of the latency); and/or for latency above the second threshold value, the robot can operate in an emergency stop mode (e.g., wherein the robot stops motion until the latency has reduced to an acceptable value). However, Block S650 can include otherwise executing operating instructions.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for remote operation of a robot, comprising:
   at a first camera of the robot, capturing a first video stream;
   substantially concurrent with capturing the first video stream, at a second camera of the robot, capturing a second video stream;
   at the robot:
     processing the first video stream to generate a first processed video stream;
     processing the second video stream to generate a second processed video stream, comprising performing a bitrate reduction process;
     combining the first and second processed video streams into a first combined video stream; and
     transmitting the first combined video stream to a remote operation system, said transmitting including transmitting the first combined video stream and at least one redundant copy of the first combined video stream to the remote operation system;
   at the remote operation system:
     receiving the first combined video stream and the at least one redundant copy of the first combined video stream from the robot;
     in response to receiving the first combined video stream and the at least one redundant copy of the first combined video stream, dynamically selecting one of the first combined video stream or the at least one redundant copy of the first combined video stream and displaying the selected combined video stream to an operator;
     while displaying the selected combined video stream, receiving a control input from the operator;
     in response to receiving the control input, generating a control instruction based on the control input; and
     in response to generating the control instruction, transmitting the control instruction to the robot;
   at the robot:
     receiving the control instruction from the remote operation system;
     in response to receiving the control instruction, controlling robot operation based on the control instruction;
     after controlling robot operation based on the control instruction, sampling a measurement;
     based on the measurement, determining an increased priority state associated with the second camera;
     after determining the increased priority state, at the first camera, capturing a third video stream;
     substantially concurrent with capturing the third video stream, at the second camera, capturing a fourth video stream;
     based on the increased priority state, processing the third video stream to generate a third processed video stream, wherein a first processed video stream bitrate is not less than a third processed video stream bitrate;
     based on the increased priority state, processing the fourth video stream to generate a fourth processed video stream, wherein a second processed video stream bitrate is less than a fourth processed video stream bitrate;
     combining the third and fourth processed video streams into a second combined video stream; and
     transmitting the second combined video stream to the remote operation system.

2. The method of claim 1, wherein the measurement is indicative of a change in robot surroundings within a second camera field of view.

3. The method of claim 1,
   wherein while capturing the second video stream, the second camera is proximal and oriented substantially toward a wall,
   wherein the second video stream includes substantially only imagery of the wall, and
   wherein the fourth video stream comprises imagery of an object other than the wall.

4. The method of claim 1,
   wherein the measurement is indicative of an obstacle, and
   wherein said processing the fourth video stream comprises, at the robot, superimposing an indication of the obstacle onto the fourth video stream.

5. The method of claim 1, further comprising, at the robot:
   performing a lossy compression process on the first combined video stream; and
   performing the lossy compression process on the second combined video stream.

6. The method of claim 1,
   wherein the first combined video stream is transmitted from the robot to the remote operation system via a first cellular carrier network, and
   wherein each of the at least one redundant copy of the first combined video stream is transmitted to the remote operation system via respective different cellular carrier networks.

7. The method of claim 1,
   wherein said performing the bitrate reduction process includes reducing video resolution, and
   wherein a fourth processed video stream resolution is greater than a second processed video stream resolution.

8. The method of claim 1,
   wherein the first processed video stream bitrate is greater than the second processed video stream bitrate, and
   wherein the third processed video stream bitrate is less than the fourth processed video stream bitrate.

9. A system for remote operation of a robot, comprising:
   control circuitry of the robot configured to:
     process a first video stream captured using a first camera of the robot to generate a first processed video stream, process a second video stream, captured substantially concurrent with the first video stream using a second camera of the robot, to generate a second processed video stream, comprising performing a bitrate reduction process, combine the first and second processed video streams into a first combined video stream, transmit the first combined video stream to a remote operation system, responsive to receiving a control instruction from the remote operation system, control robot operation based on the control instruction, sample a measurement after controlling the robot operation based on the control instruction, determine an increased priority state associated with the second camera based on the sampled measurement, capture, using the first camera, a third video stream after determining the increased priority state, capture, using the second camera, a fourth video stream substantially concurrent with the capture of the third video stream, process the third video stream to generate a third processed video stream based on the increased priority state, wherein a first processed video stream bitrate is not less than a third processed video stream bitrate, process the fourth video stream to generate a fourth processed video stream based on the increased priority state, wherein a second processed video stream bitrate is less than a fourth processed video stream bitrate, combine the third and fourth processed video streams into a second combined video stream, and transmit the second combined video stream to the remote operation system.

10. The system of claim 9, further comprising circuitry of the remote operation system, the circuitry being configured to:

display the first combined video stream to an operator in response to receiving the first combined video stream from the control circuitry of the robot, receive a control input from the operator while displaying the first combined video stream, generate the control instruction based on the control input, and transmit the control instruction to the control circuitry of the robot.

11. The system of claim 9, wherein the measurement is indicative of a change in robot surroundings within a second camera field of view.

12. The system of claim 9, wherein the measurement is indicative of an obstacle, and wherein the processing of the fourth video stream comprises, at the robot, superimposing an indication of the obstacle onto the fourth video stream.

13. The system of claim 9, wherein the control circuitry of the robot is configured to:

perform a lossy compression process on the first combined video stream; and perform the lossy compression process on the second combined video stream.

14. The system of claim 9, wherein wherein the performing of the bitrate reduction process includes reducing video resolution, and wherein a fourth processed video stream resolution is greater than a second processed video stream resolution.

15. The system of claim 9, wherein the first processed video stream bitrate is greater than the second processed video stream bitrate, and wherein the third processed video stream bitrate is less than the fourth processed video stream bitrate.

16. The system of claim 9, wherein the control circuitry of the robot is configured to transmit a redundant copy of the first combined video stream to the remote operation system, and wherein the first combined video stream is transmitted to the remote operation system using a first cellular carrier network, and wherein the redundant copy of the first combined video stream is transmitted to the remote operation system using a second cellular carrier network different from the first cellular carrier network.

17. A method for remote operation of a robot, comprising:

at the robot:

processing a first video stream captured using a first camera at the robot to generate a first processed video stream, processing a second video stream, captured substantially concurrent with the first video stream using a second camera at the robot, to generate a second processed video stream, comprising performing a bitrate reduction process, combining the first and second processed video streams into a first combined video stream, transmitting the first combined video stream to a remote operation system, said transmitting including transmitting the first combined video stream and a redundant copy of the first combined video stream to the remote operation system for selection by the remote operation system, in response to receiving a control instruction from the remote operation system after said transmitting the first combined video stream and the redundant copy of the first combined video stream to the remote operation system, controlling robot operation based on the control instruction, after controlling robot operation based on the control instruction, sampling a measurement, based on the measurement, determining an increased priority state associated with the second camera, based on the increased priority state, processing a third video stream captured using the first camera to generate a third processed video stream, wherein a first processed video stream bitrate is not less than a third processed video stream bitrate, based on the increased priority state, processing a fourth video stream, captured using the second camera substantially concurrent with the capturing of the third video stream, to generate a fourth processed video stream, wherein a second processed video stream bitrate is less than a fourth processed video stream bitrate, and combining the third and fourth processed video streams into a second combined video stream.

18. The method of claim 17, further comprising transmitting the second combined video stream to the remote operation system.

19. The method of claim 17, further comprising, at the remote operation system:
- receiving the first combined video stream and the redundant copy of the first combined video stream from the robot,
- in response to receiving the first combined video stream and the redundant copy of the first combined video stream, dynamically selecting one of the first combined video stream or the redundant copy of the first combined video stream and displaying the selected combined video stream to an operator,
- while displaying the selected combined video stream, receiving a control input from the operator,
- in response to receiving the control input, generating the control instruction based on the control input, and
- in response to generating the control instruction, transmitting the control instruction to the robot.

20. The method of claim 17,
- wherein the first combined video stream is transmitted to the remote operation system using a first cellular carrier network, and
- wherein the redundant copy of the first combined video stream is transmitted to the remote operation system using a second cellular carrier network different from the first cellular carrier network.

* * * * *